United States Patent
Bae et al.

(10) Patent No.: US 10,484,116 B2
(45) Date of Patent: Nov. 19, 2019

(54) APPARATUS FOR CONVERTING BROADCAST SIGNAL AND METHOD FOR USING THE SAME

(71) Applicant: ELECTRONICS AND TELECOMMUNICATIONS RESEARCH INSTITUTE, Daejeon (KR)

(72) Inventors: Byung-Jun Bae, Daejeon (KR); Hye-Ju Oh, Daejeon (KR); Yong-Seong Cho, Daejeon (KR); Heung-Mook Kim, Daejeon (KR); Joon-Young Jung, Daejeon (KR); Nam-Ho Hur, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 14 days.

(21) Appl. No.: 15/786,401

(22) Filed: Oct. 17, 2017

(65) Prior Publication Data

US 2018/0145777 A1    May 24, 2018

(30) Foreign Application Priority Data

Nov. 24, 2016  (KR) .......................... 10-2016-0157600
Aug. 1, 2017   (KR) .......................... 10-2017-0097744

(51) Int. Cl.
*H04H 20/78*  (2008.01)
*H04H 40/90*  (2008.01)
(Continued)

(52) U.S. Cl.
CPC ............ *H04H 20/78* (2013.01); *H04H 20/63* (2013.01); *H04H 20/95* (2013.01); *H04H 40/27* (2013.01);
(Continued)

(58) Field of Classification Search
None
See application file for complete search history.

(56) References Cited

U.S. PATENT DOCUMENTS

| 5,534,913 A | * | 7/1996 | Majeti ..................... H04H 20/79 348/E7.07 |
| 2003/0081686 A1 | * | 5/2003 | Jung ....................... H04H 20/78 375/240.25 |

(Continued)

FOREIGN PATENT DOCUMENTS

| KR | 10-0406253 B1 | 11/2003 |
| KR | 10-2014-0090288 A | 7/2014 |
| KR | 10-2016-0040540 A | 4/2016 |

OTHER PUBLICATIONS

Advanced Television Systems Committee ("ATSC"), ATSC Standard: Link-Layer Protocol (A/330), Sep. 19, 2016.*

*Primary Examiner* — Edemio Navas, Jr.

(57) ABSTRACT

Disclosed herein are an apparatus and method for converting a broadcast signal. The apparatus for converting a broadcast signal includes a demultiplexer unit for receiving a terrestrial broadcast signal and generating a terrestrial signaling signal, a signaling conversion unit for converting the terrestrial signaling signal into a cable signaling signal by parsing the terrestrial signaling signal, a cable multiplexer unit for generating a cable broadcast signal by multiplexing the cable signaling signal, and a cable modulation unit for modulating the cable broadcast signal and transmitting the cable broadcast signal over a cable network.

12 Claims, 6 Drawing Sheets

(51) Int. Cl.
    *H04N 21/236*     (2011.01)
    *H04N 21/2362*     (2011.01)
    *H04N 21/2381*     (2011.01)
    *H04N 21/2665*     (2011.01)
    *H04N 7/10*     (2006.01)
    *H04H 20/63*     (2008.01)
    *H04H 20/95*     (2008.01)
    *H04H 40/27*     (2008.01)
    *H04N 21/434*     (2011.01)
    *H04N 21/61*     (2011.01)
    *H04H 60/82*     (2008.01)

(52) U.S. Cl.
    CPC ............... *H04N 7/10* (2013.01); *H04N 7/106* (2013.01); *H04N 21/2362* (2013.01); *H04N 21/2381* (2013.01); *H04N 21/23608* (2013.01); *H04N 21/2665* (2013.01); *H04N 21/4344* (2013.01); *H04N 21/4345* (2013.01); *H04N 21/6112* (2013.01); *H04H 40/90* (2013.01); *H04H 60/82* (2013.01)

(56) References Cited

U.S. PATENT DOCUMENTS

| | | | |
|---|---|---|---|
| 2004/0015400 A1* | 1/2004 | Whymark | G06Q 30/02 |
| | | | 705/14.42 |
| 2007/0077882 A1* | 4/2007 | Patsiokas | H04H 20/74 |
| | | | 455/3.04 |
| 2015/0163513 A1 | 6/2015 | Yun et al. | |
| 2017/0188112 A1* | 6/2017 | Takahashi | H04N 19/30 |
| 2017/0207867 A1 | 7/2017 | Kwon et al. | |

\* cited by examiner

APPARATUS FOR CONVERTING BROADCAST SIGNAL AND METHOD FOR USING THE SAME

CROSS REFERENCE TO RELATED APPLICATIONS

This application claims the benefit of Korean Patent Application No. 10-2016-0157600, filed Nov. 24, 2016, and No. 10-2017-0097744, filed Aug. 1, 2017, which are hereby incorporated by reference in their entirety into this application.

BACKGROUND OF THE INVENTION

1. Technical Field

The present invention relates generally to broadcast and communications technology, and more particularly to technology for converting a terrestrial broadcast signal into a cable broadcast signal in order to retransmit the terrestrial broadcast signal over a cable network.

2. Description of the Related Art

Digital terrestrial television or digital cable television, referred to as "DTV", is configured such that broadcast service configuration information is delivered to respective DTV receivers using a signaling signal based on Program-Specific Information (PSI) defined by the Moving Picture Experts Group (MPEG) and on the Program and System Information Protocol (PSIP) standard defined by the Advanced Television Systems Committee (ATSC).

Here, the DTV receivers analyze the broadcast service configuration information by parsing the received signaling signal, decode Audio-Visual (AV) media based on the analyzed information, and play the decoded AV media.

Recently introduced terrestrial UHDTV service may provide services using a newly defined "ATSC 3.0" signaling method rather than the above-described signaling method. The signaling method based on ATSC 3.0 is defined such that it works well with IP-based services and such that the interaction between service provision layers is minimized. This is because the ATSC 3.0 transport protocol includes delivery over a broadband network and aims at IP-based delivery of content. Also, a transport layer in the currently used DTV system is configured with a single part, which is an MPEG-2 Transport Stream (TS), but a transport layer in UHDTV based on ATSC 3.0 is divided into multiple parts, such as MPU/DASH, MMT/ROUTE, UDP, IP, and the like, and AV media are transmitted therethrough, which makes a great difference in the configuration of signaling.

Meanwhile, Korean Patent Application Publication No. 10-2014-0090288, titled "Apparatus for retransmitting UHD multimedia broadcast service over cable network", discloses an apparatus for retransmitting a terrestrial Ultra-High Definition (UHD) broadcast service, through which terrestrial broadcast data, corresponding to low-quality UHD video, are converted into high-quality UHD video depending on the selection of viewers, and are retransmitted over a cable network.

However, Korean Patent Application Publication No. 10-2014-0090288 has a limitation as to the conversion of terrestrial broadcast signals into cable broadcast signals that are suitable for a cable network.

SUMMARY OF THE INVENTION

An object of the present invention is to provide a terrestrial broadcast service as a cable broadcast service using a cable network.

Another object of the present invention is to convert a terrestrial broadcast signal into a cable broadcast signal in consideration of whether the transport protocol domain of the terrestrial broadcast signal matches a cable network.

A further object of the present invention is to retransmit a terrestrial broadcast signal over a cable network and to apply the retransmission thereof for satellite TV and IPTV.

In order to accomplish the above objects, an apparatus for converting a broadcast signal according to an embodiment of the present invention includes a demultiplexer unit for receiving a terrestrial broadcast signal and generating a terrestrial signaling signal; a signaling conversion unit for converting the terrestrial signaling signal into a cable signaling signal by parsing the terrestrial signaling signal; a cable multiplexer unit for generating a cable broadcast signal by multiplexing the cable signaling signal; and a cable modulation unit for modulating the cable broadcast signal and transmitting the cable broadcast signal over a cable network.

Here, when the terrestrial broadcast signal is received via a wireless network, the demultiplexer unit may generate a baseband signal by demodulating the terrestrial broadcast signal, perform baseband depacketization and ATSC Link-Layer Protocol (ALP) depacketization on the baseband signal, and thereby generate the terrestrial signaling signal.

Here, when the terrestrial broadcast signal is received via a wired network, the demultiplexer unit may generate the terrestrial signaling signal in an IP format by demultiplexing the terrestrial broadcast signal.

Here, the signaling conversion unit may be configured to acquire information about a position of a Service-Layer Signaling (SLS) signal from information acquired by parsing a Low-Level Signaling (LLS) signal of the terrestrial signaling signal, to request the SLS signal from the demultiplexer unit using the information about the position of the SLS signal, to parse the SLS signal, and to deliver information acquired by parsing the SLS signal to the demultiplexer unit.

Here, the demultiplexer unit may generate a terrestrial broadcast media signal based on the information acquired by parsing the SLS signal.

Here, the apparatus may further include a media conversion unit for converting the terrestrial broadcast media signal so as to match a format of a cable broadcast media signal.

Here, the signaling conversion unit may generate the cable signaling signal using the information acquired by parsing the LLS signal and the SLS signal and using previously stored information about a cable network.

Here, the signaling conversion unit may control the cable signaling signal in consideration of a transmission period and a transmission order.

Here, the cable multiplexer unit may multiplex the cable signaling signal and the cable broadcast media signal into a single stream.

Here, the cable multiplexer unit may further multiplex an external media signal and an additional data signal, input by a user, into the single stream.

Here, the cable multiplexer unit may generate the cable broadcast signal by multiplexing the single stream into an MPEG-2 stream format or an IP packet format.

Also, in order to accomplish the above objects, a method for converting a broadcast signal, in which an apparatus for converting a broadcast signal is used, according to an embodiment of the present invention includes receiving a terrestrial broadcast signal and generating a terrestrial signaling signal; converting the terrestrial signaling signal into a cable signaling signal by parsing the terrestrial signaling signal; generating a cable broadcast signal by multiplexing the cable signaling signal; and modulating the cable broadcast signal and transmitting the cable broadcast signal over a cable network.

Here, converting the terrestrial signaling signal may be configured to acquire information about a position of a Service-Layer Signaling (SLS) signal from information acquired by parsing a Low-Level Signaling (LLS) signal of the terrestrial signaling signal, to acquire the SLS signal from the terrestrial signaling signal using the information about the position of the SLS signal, and to parse the acquired SLS signal.

Here, converting the terrestrial signaling signal may be configured to generate a terrestrial broadcast media signal based on the information acquired by parsing the SLS signal.

Here, converting the terrestrial signaling signal may be configured to convert the terrestrial broadcast media signal so as to match a format of a cable broadcast media signal.

Here, converting the terrestrial signaling signal may be configured to generate the cable signaling signal using the information acquired by parsing the LLS signal and the SLS signal and using previously stored information about a cable network.

Here, converting the terrestrial signaling signal may be configured to control the cable signaling signal in consideration of a transmission period and a transmission order.

Here, generating the cable broadcast signal may be configured to multiplex the cable signaling signal and the cable broadcast media signal into a single stream.

Here, generating the cable broadcast signal may be configured to further multiplex an external media signal and an additional data signal, input by a user, into the single stream.

Here, generating the cable broadcast signal may be configured to generate the cable broadcast signal by multiplexing the single stream into an MPEG-2 stream format or an IP packet format.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
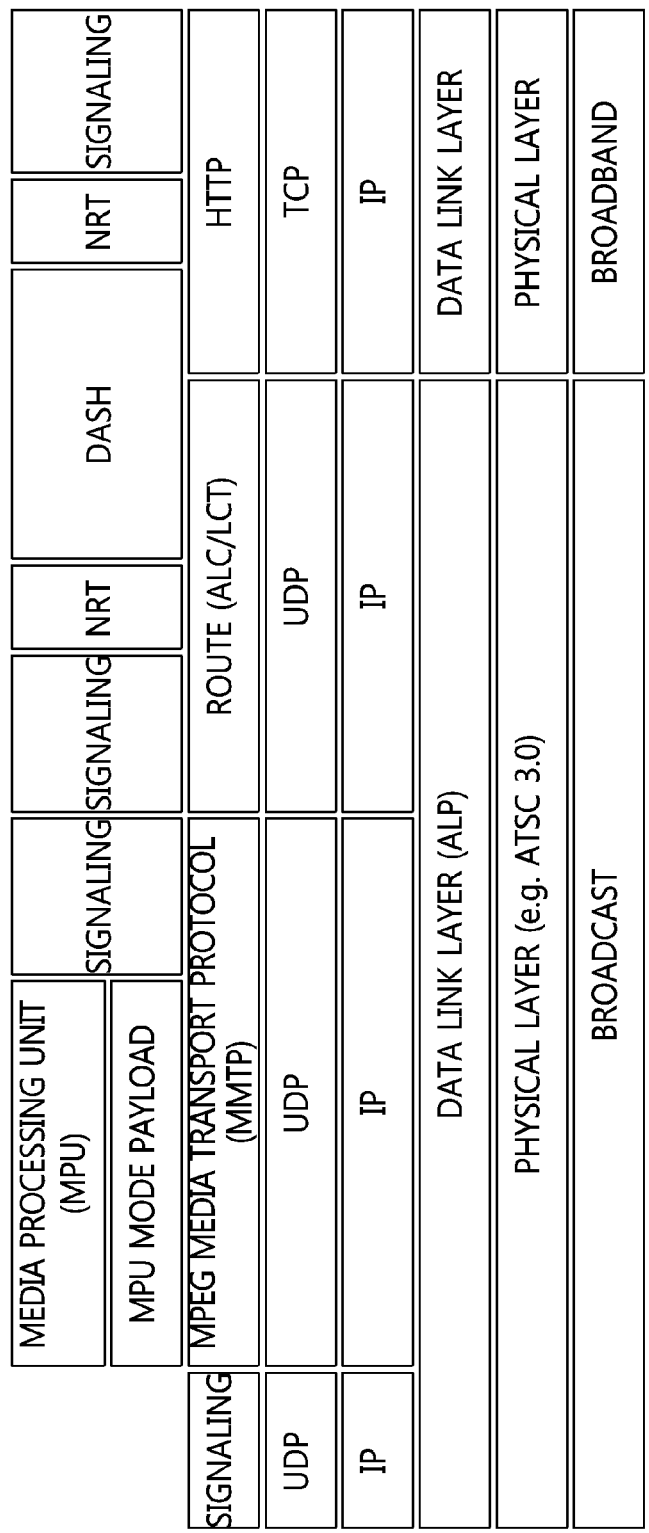
FIG. 1 is a view that shows the protocol stack of a terrestrial broadcast service according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising", and "includes" and/or "including" specify the presence of stated elements but do not preclude the presence or addition of one or more other elements unless otherwise specified.

Also, terms such as " . . . unit", " . . . device", " . . . module", and the like indicate units that process at least one function or operation, and such a unit may be implemented as hardware, software, or a combination thereof.

Hereinafter, a preferred embodiment of the present invention will be described in detail with reference to the accompanying drawings.

FIG. 1 is a view that shows the protocol stack of a terrestrial broadcast service according to an embodiment of the present invention.

Referring to FIG. 1, the protocol stack of a terrestrial broadcast service according to an embodiment of the present invention may be applied to a broadcast network and a broadband network of the ATSC 3.0 standard and the Korean standard for a UHD broadcast transmitter/receiver interface.

As illustrated in FIG. 1, the ATSC 3.0 standard used in North America and the Korean UHD broadcast standard may include the MPEG Media Transport Protocol (MMTP) for transmitting Media Processing Units (MPUs) over a broadcast network and the ROUTE/DASH transport protocol for transmitting DASH segments and NRT files over the broadcast network. Also, like the ROUTE/DASH transport protocol, DASH segments and NRT files may also be transmitted using TCP/IP over a broadband network.

Here, the apparatus and method for converting a broadcast signal according to an embodiment of the present invention may convert a terrestrial broadcast signal into a cable broadcast signal in consideration of the protocol stack of a terrestrial broadcast service.

Figure 2:
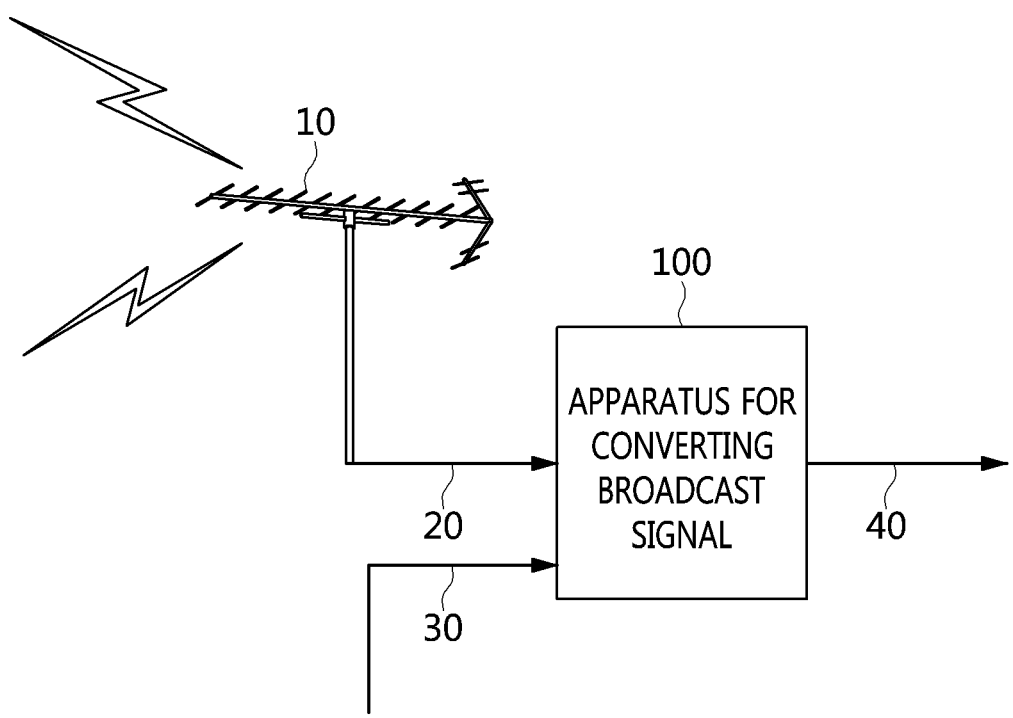
FIG. 2 is a view that shows the process of converting a broadcast signal according to an embodiment of the present invention.

FIG. 2 is a view that shows the process of converting a broadcast signal according to an embodiment of the present invention.

Referring to FIG. 2, in the process of converting a broadcast signal according to an embodiment of the present invention, an antenna 10 may receive a terrestrial broadcast signal 20, which is transmitted by radio waves, and may then deliver the same to an apparatus 100 for converting a broadcast signal.

Also, a terrestrial broadcast signal 30 that is not modulated may be input via a cable based on IP.

Here, the terrestrial broadcast signal may be a terrestrial UHDTV signal.

Here, the apparatus 100 for converting a broadcast signal may convert the terrestrial broadcast signal 20 or 30 into a cable broadcast signal 40 and retransmit the cable broadcast signal over a cable network.

Here, the apparatus 100 for converting a broadcast signal may receive a wireless RF signal or an IP signal corresponding to the terrestrial broadcast signal 20 or 30, convert the format thereof so as to match a cable broadcast signal 40, and transmit the signal over a cable network.

In the case of a terrestrial broadcast signal according to an embodiment of the present invention, broadcast service signaling for providing a broadcast service may be categorized into Low-Level Signaling (LLS) and Service-Layer Signaling (SLS), as in the ATSC 3.0 standard.

For example, LLS, which is received earlier than SLS, uses an IP address and a port number that are fixed at 224.0.23.60 and 4937, and the LLS may be used to deliver signaling information for rapid channel scans and bootstrapping of service acquisition.

Also, SLS, acquired by parsing the LLS, is configured such that information that is necessary to provide a broadcast service, such as information about the components of each service, a method for acquiring content, receiver capabilities required for provision of the service, and the like, is defined for each broadcast service, and the SLS may be delivered to a receiver.

That is, the apparatus 100 for converting a broadcast signal according to an embodiment of the present invention may first parse an LLS signal that is delivered via a different delivery path, and may then extract and parse an SLS signal containing information about each service based on the parsed LLS signal.

Figure 3:
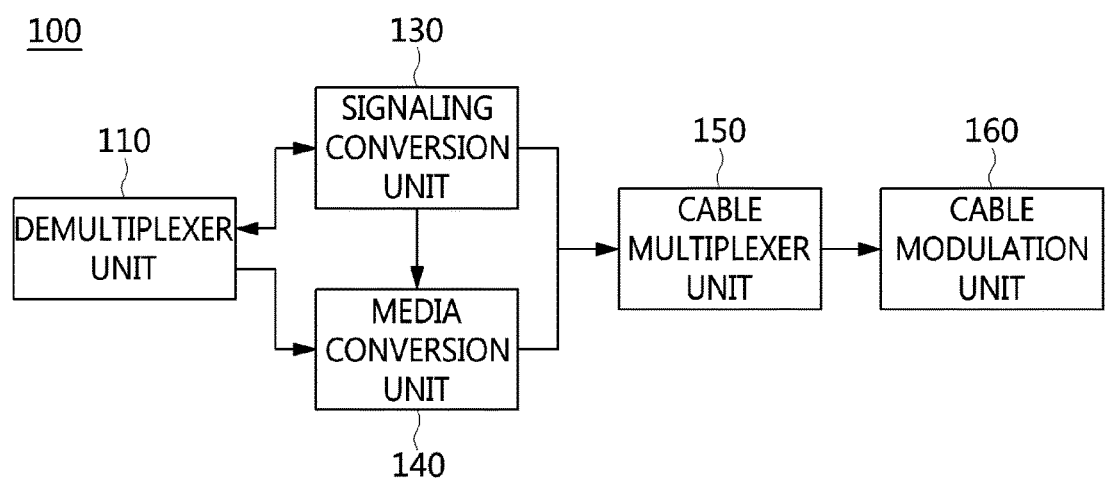
FIG. 3 is a block diagram that shows an apparatus for converting a broadcast signal according to an embodiment of the present invention.

FIG. 3 is a block diagram that shows an apparatus for converting a broadcast signal according to an embodiment of the present invention.

Referring to FIG. 3, the apparatus 100 for converting a broadcast signal according to an embodiment of the present invention includes a demultiplexer unit 110, a signaling conversion unit 130, a media conversion unit 140, a cable multiplexer unit 150, and a cable modulation unit 160.

The demultiplexer unit 110 may receive a terrestrial broadcast signal and generate a terrestrial signaling signal.

Here, the terrestrial broadcast signal may be a UHDTV service signal based on the ATSC 3.0 standard.

Here, the demultiplexer unit 110 may output a baseband signal by demodulating the terrestrial broadcast signal, which is received via a wireless network, based on the ATSC 3.0 standard.

Here, the demultiplexer unit 110 may also generate a terrestrial signaling signal in an IP stream by performing baseband depacketization and ATSC Link-Layer Protocol (ALP) depacketization on the baseband signal.

Here, the demultiplexer unit 110 may generate a signaling signal, a video media signal, and an audio media signal corresponding to respective IP formats by performing depacketization.

Also, when the terrestrial broadcast signal is input via a cable based on IP, the demultiplexer unit 110 may directly output an IP stream by demultiplexing the terrestrial broadcast signal.

Here, the demultiplexer unit 110 may generate a signaling signal, a video media signal, and an audio media signal corresponding to respective IP formats by performing demultiplexing.

The signaling conversion unit 130 may convert the terrestrial signaling signal into a cable signaling signal by parsing the terrestrial signaling signal.

Here, the signaling conversion unit 130 may request an LLS signal included in the terrestrial signaling signal, which contains basic information for rapid channel scans and service acquisition, from the demultiplexer unit 110.

Here, the demultiplexer unit 110 may deliver the requested LLS signal to the signaling conversion unit 130.

Here, the signaling conversion unit 130 may parse the LLS signal and request an SLS signal, which contains service configuration information required for the provision of a broadcast service, from the demultiplexer unit 110 using the information acquired by parsing the LLS signal.

Here, the demultiplexer unit 110 may deliver the requested SLS signal to the signaling conversion unit 130.

Here, the signaling conversion unit 130 may parse the SLS signal and deliver information acquired by parsing the SLS signal to the demultiplexer unit 110.

Here, the demultiplexer unit 110 may generate a terrestrial broadcast media signal based on the information acquired by parsing the SLS signal.

Here, the demultiplexer unit 110 may deliver the generated terrestrial broadcast medial signal to the media conversion unit 140.

Here, the terrestrial broadcast media signal may include video media and audio media.

Here, the signaling conversion unit 130 may generate a cable signaling signal using the information acquired by parsing the LLS signal and the SLS signal and using previously stored information about a cable network.

Here, the cable signaling signal may correspond to a cable PSI/PSIP signal, and may become a future cable broadcast signaling signal.

Here, the signaling conversion unit 130 may generate the cable signaling signal by additionally using user-input information about the addition of a cable media signal from an external input signal or the modification of information related to transmission over a cable network.

Here, the signaling conversion unit 130 may control the cable signaling signal in consideration of a transmission period and a transmission order.

Here, the signaling conversion unit 130 may deliver the controlled cable signaling signal to the cable multiplexer unit 150.

The media conversion unit 140 may convert the terrestrial broadcast media signal so as to match the format of a cable broadcast media signal.

Here, the media conversion unit 140 may convert the format of a media signal using various methods.

For example, the media conversion unit 140 may convert the terrestrial broadcast media signal into an analog signal by decoding the terrestrial broadcast media signal and encode the analog signal into a cable broadcast media signal.

In another example, the media conversion unit 140 may use a method in which coded data are maintained and only the format of media is converted.

The cable multiplexer unit 150 may generate a cable broadcast signal by multiplexing the cable signaling signal.

Here, the cable multiplexer unit 150 may multiplex the cable signaling signal and the cable broadcast media signal into a single stream.

Here, the cable multiplexer unit 150 may further multiplex an external media signal and an additional data signal, input by a user, into a single stream.

Here, the cable multiplexer unit 150 may generate the cable broadcast signal by multiplexing the single stream into an MPEG-2 stream format or an IP packet format.

Here, the cable multiplexer unit 150 may stream the cable broadcast signal in another format depending on the future development of technology.

The cable modulation unit 160 may modulate the cable broadcast signal and transmit the same over a cable network.

Here, the cable modulation unit 160 may modulate the cable broadcast signal so as to be converted into an RF signal that is suitable for a cable network.

Figure 4:
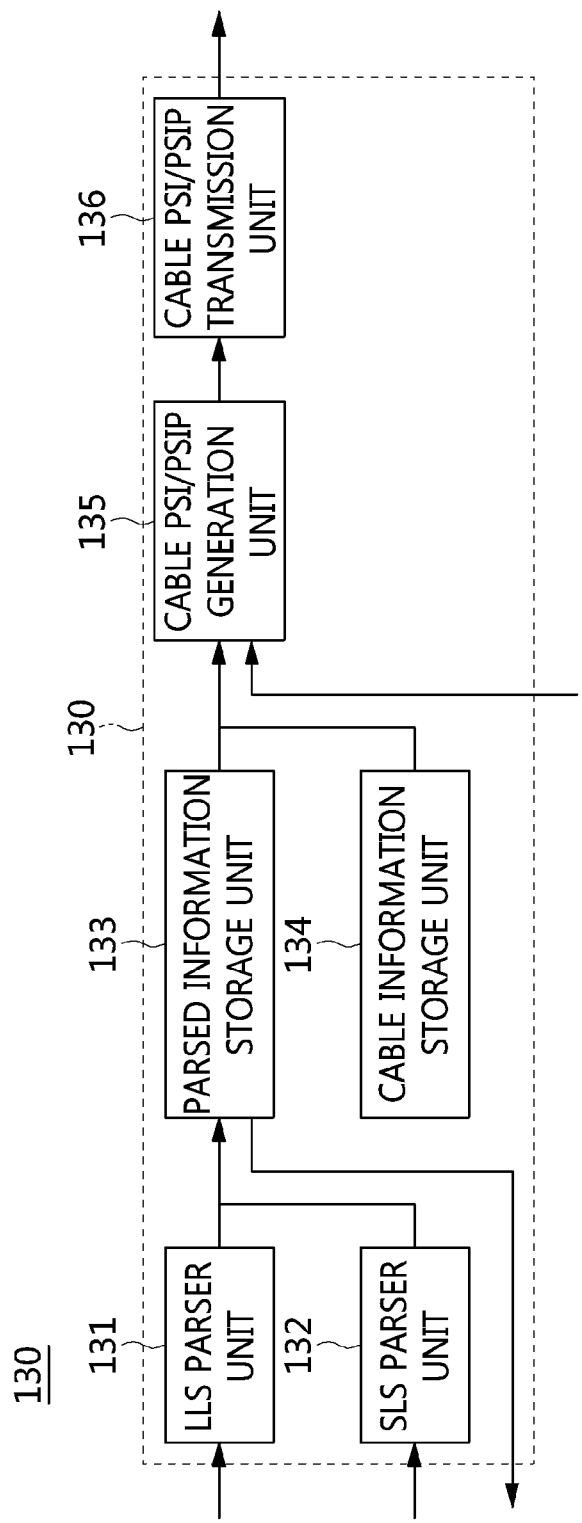
FIG. 4 is a block diagram that specifically shows an example of the signaling conversion unit illustrated in FIG. 3.

FIG. 4 is a block diagram that specifically shows an example of the signaling conversion unit illustrated in FIG. 3.

Referring to FIG. 4, the signaling conversion unit 130 may include an LLS parser unit 131, an SLS parser unit 132, a parsed information storage unit 133, a cable information storage unit 134, a cable PSI/PSIP generation unit 135, and a cable PSI/PSIP transmission unit 136.

In the signaling conversion unit 130, the LLS parser unit 131 and the SLS parser unit 132 are separate in order to respectively parse an LLS signal and an SLS signal because a terrestrial broadcast signal may be defined as two types of service signaling, that is, LLS and SLS.

The LLS parser unit 131 may request an LLS signal from the demultiplexer unit 110, parse the LLS signal received therefrom, and store information acquired by parsing the LLS signal in the parsed information storage unit 133.

The parsed information storage unit 133 may locate an SLS signal using the information acquired by parsing the LLS signal, and may deliver information about the position of the SLS signal to the SLS parser unit 132.

The SLS parser unit 132 may request the SLS signal from the demultiplexer unit 110 using the received information about the position thereof, parse the SLS signal, and store information acquired by parsing the SLS signal in the parsed information storage unit 133.

The parsed information storage unit 133 may deliver the information acquired by parsing the LLS signal and the SLS signal, which is stored therein, to the demultiplexer unit 110, the media conversion unit 140, and the cable PSI/PSIP generation unit 135.

The cable information storage unit 134 may store information about a cable network over which a cable broadcast signal is to be transmitted.

The cable PSI/PSIP generation unit 135 may generate a cable signaling signal using the information acquired by parsing the LLS signal and the SLS signal and using the previously stored information about the cable network.

Here, the cable signaling signal may correspond to a cable PSI/PSIP signal, and may become a future cable broadcast signaling signal.

Here, the cable PSI/PSIP generation unit 135 may generate the cable signaling signal by additionally using user-input information about the addition of a cable media signal from an external input signal or the modification of information related to transmission over a cable network.

For example, using the information acquired by parsing the LLS signal and the SLS signal, the cable PSI/PSIP generation unit 135 may configure the cable signaling signal so as to include a unique broadcast stream ID, a main channel number, a sub-channel number, language information, time information, and the like.

Here, the cable PSI/PSIP generation unit 135 may configure the cable signaling information so as to include a transmission frequency for transmission over a cable network, a modulation mode, and the like using the cable information previously stored in the cable information storage unit 134.

Here, using user-input information input from a user, the cable PSI/PSIP generation unit 135 may configure the cable signaling information so as to include the total number of programs, media information, and the like for adding media.

The user-input information may include various programs and media information according to a user's purpose for retransmitting the terrestrial broadcast service as a cable broadcast service.

Here, the cable PSI/PSIP transmission unit 136 may control the cable signaling signal in consideration of a transmission period and a transmission order.

Here, the cable PSI/PSIP transmission unit 136 may deliver the controlled cable signaling signal to the cable multiplexer unit 150.

Figure 5:
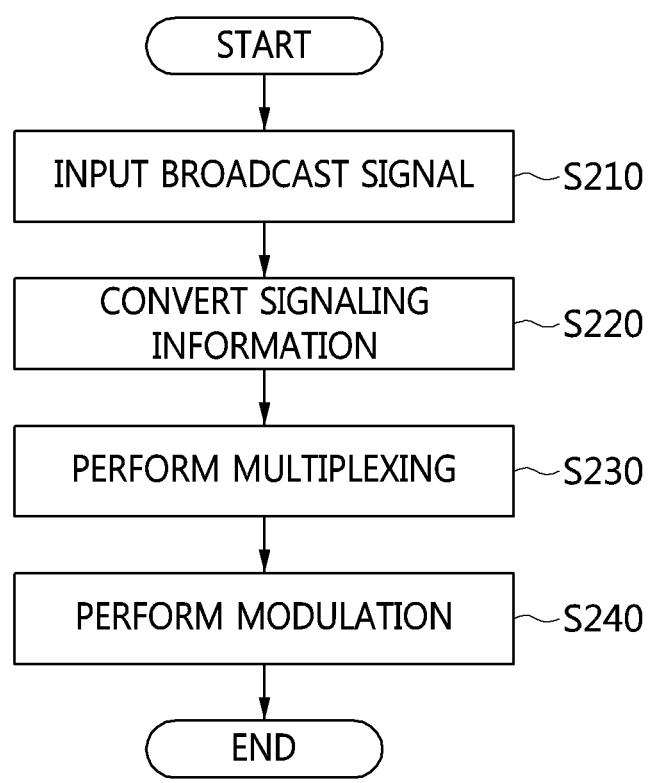
FIG. 5 is a flowchart that shows a method for converting a broadcast signal according to an embodiment of the present invention.
Figure 6:
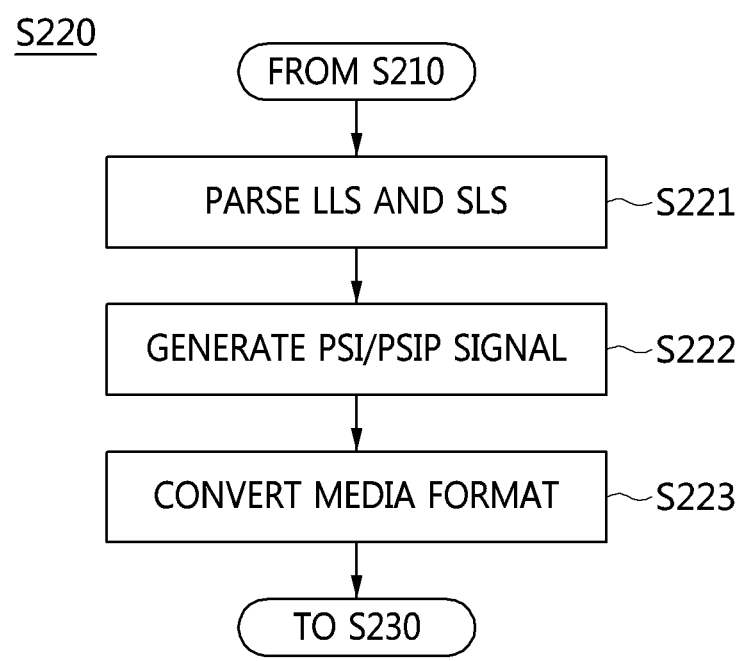
FIG. 6 is a flowchart that specifically shows an example of the step of converting a signaling signal, illustrated in FIG. 5.

FIG. 5 is a flowchart that shows a method for converting a broadcast signal according to an embodiment of the present invention. FIG. 6 is a flowchart that specifically shows an example of the step of converting a signaling signal, illustrated in FIG. 5.

Referring to FIG. 5, in the method for converting a broadcast signal according to an embodiment of the present invention, first, a terrestrial signaling signal may be generated at step S210.

That is, at step S210, first, a terrestrial broadcast signal is received, and a terrestrial signaling signal may be generated.

Here, at step S210, the terrestrial broadcast signal, received by an antenna 10, may be input, and a terrestrial broadcast signal that is not modulated may be input via a cable based on IP.

Here, the terrestrial broadcast signal may be a UHDTV service signal based on the ATSC 3.0 standard.

Here, at step S210, a baseband signal may be output by demodulating the terrestrial broadcast signal, which is received via a wireless network, based on the ATSC 3.0 standard.

Here, at step S210, a terrestrial signaling signal corresponding to an IP stream may be generated by performing baseband depacketization and ATSC Link-Layer Protocol (ALP) depacketization on the baseband signal.

Here, at step S210, a signaling signal, a video media signal, and an audio media signal corresponding to respective IP formats may be generated by performing depacketization.

Also, at step S210, when the terrestrial broadcast signal is input via a cable based on IP, an IP stream may be directly output by demultiplexing the terrestrial broadcast signal.

Here, at step S210, a signaling signal, a video media signal, and an audio media signal corresponding to respective IP formats may be generated by performing demultiplexing.

Also, in the method for converting a broadcast signal according to an embodiment of the present invention, the signaling signal may be converted at step S220.

Referring to FIG. 6, at step S220, first, an LLS signal and an SLS signal may be parsed at step S221.

That is, because a terrestrial broadcast signal may be defined as two types of service signaling, which are LLS and SLS, the LLS signal and the SLS signal may be individually parsed at step S221.

The LLS signal may include basic information for rapid channel scans and service acquisition.

The SLS signal may include service configuration information required for the provision of a broadcast service.

Here, at step S221, the LLS signal may be parsed, and information acquired by parsing the LLS signal may be stored.

Here, at step S221, the position of the SLS signal may be detected using the information acquired by parsing the LLS signal, and the SLS signal may be requested using the position of the SLS signal.

Here, at step S221, the SLS signal may be parsed, and information acquired by parsing the SLS signal may be stored.

Here, at step S221, a terrestrial broadcast media signal may be generated based on the information acquired by parsing the SLS signal.

Also, at step S220, a cable PSI/PSIP signal may be generated at step S222.

That is, at step S222, a cable signaling signal may be generated using the information acquired by parsing the LLS signal and the SLS signal and using the previously stored information about the cable network.

Here, the cable signaling signal may correspond to a cable PSI/PSIP signal.

Here, at step S222, the cable signaling signal may be generated by additionally using user-input information about the addition of a cable media signal from an external input signal or the modification of information related to transmission over a cable network.

For example, at step S222, using the information acquired by parsing the LLS signal and the SLS signal, the cable signaling signal may be configured so as to include a unique broadcast stream ID, a main channel number, a sub-channel number, language information, time information, and the like.

Here, at step S222, using the previously stored information about the cable network, the cable signaling signal may be configured so as to include a transmission frequency for transmission over a cable network, a modulation mode, and the like.

Here, at step S222, using user-input information, the cable signaling signal may be configured so as to include the total number of programs, media information, and the like for adding media.

The user-input information may include various programs and media information according to a user's purpose for retransmitting the terrestrial broadcast service as a cable broadcast service.

Here, at step S222, the cable signaling signal may be controlled in consideration of a transmission period and a transmission order.

Here, at step S222, the controlled cable signaling signal may be output.

Also, at step S220, a media format may be converted at step S223.

That is, at step S223, the terrestrial broadcast media signal may be converted so as to match the format of a cable broadcast media signal.

Here, step S223 may be performed after performing step S221.

Here, at step S223, the format of a media signal may be converted using various methods.

For example, at step S223, the terrestrial broadcast media signal may be converted into an analog signal by decoding the terrestrial broadcast media signal, and may be encoded into a cable media signal.

In another example, at step S223, a method in which coded data are maintained and only the format of media is converted may be used.

Also, step S223 may be performed after the SLS signal is parsed at step S221, rather than after performing step S222.

Also, in the method for converting a broadcast signal according to an embodiment of the present invention, multiplexing may be performed at step S230.

That is, at step S230, a cable broadcast signal may be generated by multiplexing the cable signaling signal.

Here, at step S230, the cable signaling signal and the cable broadcast media signal may be multiplexed into a single stream.

Here, at step S230, an external media signal and an additional data signal, input by a user, may be further multiplexed into a single stream.

Here, at step S230, the cable broadcast signal may be generated by multiplexing the single steam into an MPEG-2 stream format or an IP stream format.

Here, at step S230, the cable broadcast signal may be streamed in another format depending on the future development of technology.

Also, in the method for converting a broadcast signal according to an embodiment of the present invention, modulation may be performed at step S240.

That is, at step S240, the cable broadcast signal is modulated, and may then be transmitted over a cable network.

Here, at step S240, the cable broadcast signal may be modulated so as to be converted into an RF signal suitable for the cable network.

According to the present invention, a terrestrial broadcast service may be provided as a cable broadcast service using a cable network.

Also, according to the present invention, a terrestrial broadcast signal may be converted into a cable broadcast signal in consideration of whether the transport protocol domain of the terrestrial broadcast signal matches a cable network.

Also, the present invention may be applied not only to the retransmission of a terrestrial broadcast signal over a cable network but also to the retransmission thereof for satellite TV and IPTV.

As described above, the apparatus and method for converting a broadcast signal according to the present invention are not limitedly applied to the configurations and operations of the above-described embodiments, but all or some of the embodiments may be selectively combined and configured, so that the embodiments may be modified in various ways.

What is claimed is:

1. An apparatus for converting a terrestrial broadcast signal into a cable broadcast signal, comprising:
   a demultiplexer unit for receiving the terrestrial broadcast signal and generating a terrestrial signaling signal based on the terrestrial broadcast signal;
   a signaling conversion unit for converting the terrestrial signaling signal into a cable signaling signal by parsing the terrestrial signaling signal;
   a cable multiplexer unit for generating the cable broadcast signal by multiplexing the cable signaling signal and a cable broadcast media signal; and
   a cable modulation unit for modulating the cable broadcast signal and transmitting the modulated cable broadcast signal over a cable network,
   wherein the signaling conversion unit acquires information about a position of a Service-Layer Signaling (SLS) signal by parsing a Low-Level Signaling (LLS) signal of the terrestrial signaling signal,
   wherein the signaling conversion unit acquires the SLS signal from the demultiplexer unit using the information about the position of the SLS signal, parses the acquired SLS signal, and delivers information acquired by parsing the SLS signal to the demultiplexer unit,
   wherein the demultiplexer unit generates a terrestrial broadcast media signal based on the information acquired by parsing the SLS signal, and
   wherein the apparatus further comprises a media conversion unit for converting the terrestrial broadcast media signal into the cable broadcast media signal by changing a format of the terrestrial broadcast media signal.

2. The apparatus of claim 1, wherein, when the terrestrial broadcast signal is received via a wireless network, the demultiplexer unit generates a baseband signal by demodulating the terrestrial broadcast signal, performs baseband depacketization and ATSC Link-Layer Protocol (ALP) depacketization on the baseband signal, and thereby generates the terrestrial signaling signal.

3. The apparatus of claim 2, wherein, when the terrestrial broadcast signal is received via a wired network, the demultiplexer unit generates the terrestrial signaling signal in an IP format by demultiplexing the terrestrial broadcast signal.

4. The apparatus of claim 1, wherein the signaling conversion unit generates the cable signaling signal using the information acquired by parsing the LLS signal, the information acquired by parsing the SLS signal, and previously stored information about the cable network.

5. The apparatus of claim 4, wherein the signaling conversion unit controls the cable signaling signal in consideration of a transmission period and a transmission order.

6. The apparatus of claim 5, wherein the cable multiplexer unit multiplexes the cable signaling signal and the cable broadcast media signal into a single stream.

7. The apparatus of claim 6, wherein the cable multiplexer unit further multiplexes an external media signal and an additional data signal, input by a user, into the single stream.

8. The apparatus of claim 7, wherein the cable multiplexer unit generates the cable broadcast signal by multiplexing the single stream into any one of an MPEG-2 stream format and an IP stream format.

9. A method for converting a terrestrial broadcast signal into a cable broadcast signal, in which an apparatus for converting the broadcast signal into the cable broadcast signal is used, the method comprising:
  receiving the terrestrial broadcast signal;
   generating a terrestrial signaling signal based on the terrestrial broadcast signal;
  converting the terrestrial signaling signal into a cable signaling signal by parsing the terrestrial signaling signal;
  generating the cable broadcast signal by multiplexing the cable signaling signal and a cable broadcast media signal; and
  modulating the cable broadcast signal and transmitting the modulated cable broadcast signal over a cable network,
  wherein converting the terrestrial signaling signal includes:
   acquiring information about a position of a Service-Layer Signaling (SLS) signal by parsing a Low-Level Signaling (LLS) signal of the terrestrial signaling signal;
   acquiring the SLS signal using the information about the position of the SLS signal and parsing the acquired SLS signal;
   generating a terrestrial broadcast media signal based on the information acquired by parsing the SLS signal; and
   converting the terrestrial broadcast media signal into the cable broadcast media signal by changing a format of the terrestrial broadcast media signal.

10. The method of claim 9, wherein converting the terrestrial signaling signal further includes generating the cable signaling signal using the information acquired by parsing the LLS signal, the information acquired by parsing the SLS signal, previously stored information about the cable network.

11. The method of claim 10, wherein converting the terrestrial signaling signal further includes controlling the cable signaling signal in consideration of a transmission period and a transmission order.

12. The method of claim 11, wherein generating the cable broadcast signal includes multiplexing the cable signaling signal and the cable broadcast media signal into a single stream.

* * * * *